Dec. 7, 1965 P. GIUFFRIDA 3,222,492
MANUFACTURE OF ELECTRONIC COMPONENTS
Filed Feb. 7, 1963
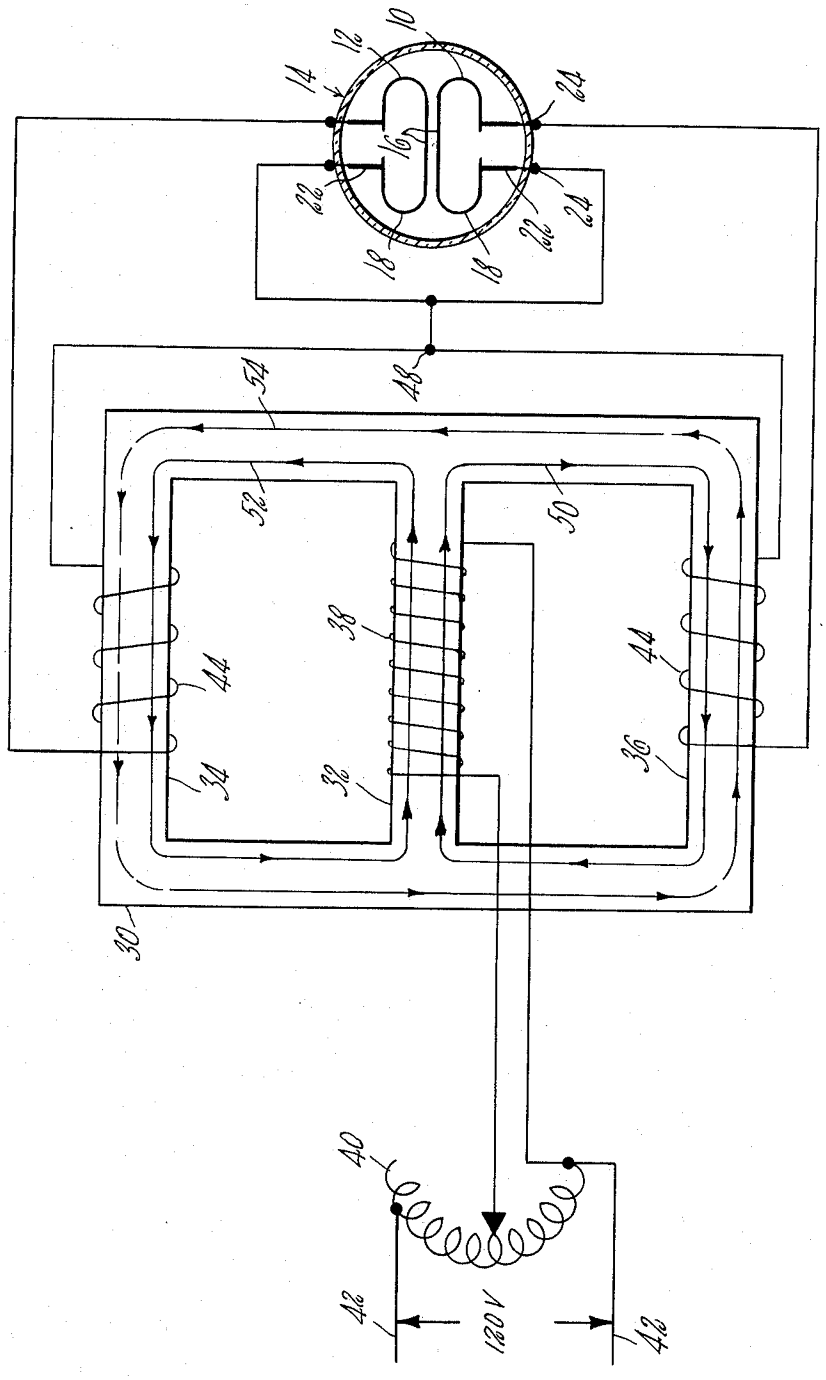

3,222,492

MANUFACTURE OF ELECTRONIC COMPONENTS

Philip Giuffrida, North Andover, and John Pratt, Braintree, Mass., assignors to Electronics Corporation of America, Cambridge, Mass., a corporation of Massachusetts Filed Feb. 7, 1963, Ser. No. 256,932
6 Claims. (Cl. 219—50)

This invention relates to improvements in the manufacture of electronic components and more particularly to methods and apparatus for purifying two matched electrodes of the type employed in a Geiger-Mueller radiation sensitive tube device that is useful as a combustion flame sensor.

In combustion control systems it is important to sense a flame component and distinguish that flame component from other similar sources. There are unique characteristics of combustion flames, for example there is a flame flicker frequency having a range of approximately 5–25 cycles per second, and sensing equipment tuned to that frequency is used to discriminate against signals of other frequencies such as those from steady-state radiation or power line transients for example. Another characteristic of combustion flame which lends itself to discriminatory detection is that it emits a considerable magnitude of ultraviolet radiation at wavelengths below about 2800 Angstroms whereas most interfering radiation sources such as solar or incandescent lamp light, incandescent furnace walls of temperature in the more usual ranges or fluorescent lamp light do not produce readily detectable amounts of radiation below 2800 Angstrom wavelength. In the manufacture of devices for detecting this unique ultraviolet radiation, tungsten electrodes are particularly suitable as pure tungsten has a work function between 4.4 and 5.3 which gives a photoelectric response to radiation of wavelengths from 2800 Angstroms down to approximately 2300 Angstroms. However, in order to provide accurate and reliable operation in response to the frequency of radiation, the tungsten electrodes must be purified after the electrode configuration has been fabricated. A preferred form is a single wire which has been processed in a swaging operation so that the exposed tungsten crystal surface in the wire has a uniform work function. The electrode wire surface is then polished and purified with a view toward maximizing their purity throughout their operating life. A typical step in this purification operation is slowly heating them to a temperature of approximately 1200° C. to expel any impurities within the wire electrodes. In the sensing device two spaced electrodes are employed between which an electric field is created so that a photoelectron may be emitted in response to ultraviolet radiation and produce an avalanche breakdown on the gas in the tube between the electrodes, which breakdown signals the detection of the ultraviolet radiation of interest. Where two electrodes of the same configuration are utilized, both electrodes should be purified to the same extent so that they have similar work functions and hence give the same response to impinging radiation. However, even with extremely well controlled production techniques, there are frequently substantial differences in the total resistances of the two electrodes which render conventional resistance heating techniques inappropriate and inadequate.

It is an object of this invention to provide novel and improved methods and apparatus for purifying electrode structures to provide radiation sensitive characteristics.

Another object of the invention is to provide novel and improved methods and apparatus for purifying electrode structures by resistance heating techniques.

Still another object of the invention is to provide novel and improved apparatus for heating two physically similar metal electrodes to the same temperature in a metal purifying operation.

In the practice of the invention two electrodes of identical physical configuration are supported within an evacuable casing in their ultimate intended position. Electrode energizing terminals are brought out from either end of each electrode for connection to a source of electricity so that electric current can be passed through each electrode. In accordance with the invention electric current is supplied to these electrodes through a control device which automatically balances the power supplied to the two electrodes. This power is supplied from two identical energizing windings which are inductively linked together and also which are inductively energized from a common source. In the preferred embodiment the two electrodes are connected together at a common circuit terminal to which the two energizing windings are connected. Energy supplied to the electrodes is a function of the resistance characteristics of the two electrodes and the control device supplies the same power to each electrode where the difference in resistance between them is as great as 50%. By the apparatus of the invention it is thus possible to equally resistance heat and purify the electrodes in a high temperature purifying operation.

Other objects, features and advantages of the invention will be seen as the following description of a preferred embodiment thereof progresses in conjunction with the drawing, in which the single figure shows a diagrammatic representation of electrode purification apparatus constructed in accordance with the invention.

The electrodes to be processed are designated by the reference numerals 10, 12 and are housed in a gas tight envelope 14 filled with a reducing atmosphere such as hydrogen. The two electrodes 10, 12 are of the same size and shape and each is a single tungsten wire formed with a straight portion 16 that is aligned in parallel spaced relation with the corersponding straight portion of the other electrode and smoothly curved end portions 18 which are positioned out of the active electrode area (that area being between the straight portions 16). Each end of each electrode is welded to a corresponding support 22 of tungsten and the support 22 is suitably brought out through the envelope 14 to terminal 24 for external connection.

In the processing of these electrodes after they have been fabricated, cleaned, polished and assembled in this configuration, it is necessary to heat each electrode to a temperature in the order of 1200° C. to drive off impurities that are still in the electrode metal. In the proper conditioning of these electrodes, they should be heated at the same rate to the same temperature so that a thermal equilibrium is maintained between them. As the two electrodes are identical in material and configuration, the conduction and radiation factors are equal, and by supplying equal power to them a thermal equilibrium between the electrodes is established and maintained during the heating operation.

Equal electrode heating is accomplished by the control device which includes a transformer core 30 having a central leg 32 and two outer legs 34, 36. Wound on the central leg 32 is a primary coil 38 which is energized through an adjustable power source 40 supplied by a 120 volt A.C. source of electrical energy that is connected at terminals 42. Mounted on the outer legs 34, 36 are identical windings 44 which have a turns ratio with respect to the primary winding so that the output voltage supplied by each winding 44 is about three volts with an output current of about fifteen amperes. Connected directly across each winding 44 through low impedance electrical connectors is an electrode 10, 12 and the two windings 44 are connected together at common terminal 48. The primary coil 38 has a primary flux path coupling each secondary winding 44 to the exclusion of the other winding 44 and these separate flux paths are diagrammatically indicated by lines 50, 52. A third flux path 54 is provided through the transformer core 30 and this flux path couples the two secondary windings 44 to the exclusion of the primary winding 38.

As the transformer is symmetrical in construction, the flux produced by the primary winding 38 divides and flows to each secondary winding 44 in proportion to the reflected impedance of the secondary winding, that is, the impedance of the secondary winding and its connected electrode. An unbalanced impedance condition also affects the flux in the mutual inductance path 54 between the two secondary windings 44 and the algebraic sum of these flux energies causes equal power to be distributed to the electrodes.

With this apparatus and control device it is possible to heat the two electrodes in uniform manner to equal temperatures as observed by optical pyrometric methods.

The method and apparatus of the invention thus enables tungsten electrodes in a radiation sensitive device to be glowed in a purifying operation during which thermal equilibrium is maintained between the two electrodes to provide electrodes of identical radiation response suitable for use in a radiation detector energized by alternating current. After the electrodes have been glowed to equal temperatures in an outgassing operation, the atmosphere in the envelope is evacuated and the tube is then filled with a suitable avalanche sustaining gas such as pure hydrogen which will support radiation initiated avalanche discharge. The resulting tube has a response to ultraviolet radiation below 2800 Angstroms, and thus has substantially no response to ultraviolet radiation from solar sources.

While a preferred embodiment of the invention has been shown and described, it will be understood that various modifications will be apparent to those skilled in the art and therefore it is not intended that the invention be limited to the disclosed embodiment or to details thereof and departures may be made therefrom within the spirit and scope of the invention as defined in the claims.

We claim:

1. The method of purifying an electrode structure to provide symmetrical radiation sensitive characteristics comprising the steps of
   mounting two electrodes of matched physical configuration in spaced relation,
   connecting each said electrode in shunt to a corresponding electric current supply winding,
   providing a magnetic flux path linking said two electric current supply windings,
   and supplying magnetic flux over two identical paths to said electric current supply windings from a source located outside of said magnetic flux path
   to induce an electric potential in said two windings and cause electric current flow through said electrodes in a resistance heating operation.

2. The method of purifying an electrode structure to provide symmetrical radiation sensitive characteristics comprising the steps of
   mounting two electrodes of matched physical configuration in spaced relation,
   connecting each said electrode in shunt to a corresponding electric current supply winding,
   providing a magnetic flux path linking said two electric current supply windings,
   supplying magnetic flux over two identical paths to said electric current supply windings from a source located outside of said magnetic flux path
   to induce an electric potential in said two windings and cause electric current flow through said electrodes in a resistance heating operation to heat said electrodes simultaneously while maintaining a thermal equilibrium between said electrodes,
   terminating the flow of electric current after said electrodes have reached a predetermined temperature in the order of 1200° C.,
   and evacuating said envelope to remove from said envelope contaminants that have been driven from said electrodes during the heating thereof.

3. Electrode purifying apparatus comprising in combination, an envelope,
   two electrodes of matched physical configuration mounted in said envelope in spaced relation,
   each said electrode having two terminals disposed externally of said envelope,
   a flux carrying core member having a primary leg and two secondary legs,
   a primary winding disposed about said primary leg for inducing flux in said core,
   a secondary winding disposed about each secondary leg,
   each secondary winding having two terminals,
   the number of turns of said secondary windings being equal to each other and being substantially less than the number of turns of said primary winding,
   said core having first and second identical flux paths and a third flux path,
   each said identical flux path including said primary leg and one of said secondary legs so that each identical flux path links said primary winding and one of said secondary windings independently of the other secondary winding,
   and said third flux path including said two secondary legs so that said third flux path links said two secondary windings independently of said primary winding,
   means connecting said secondary winding terminals to said electrode terminals so that each electrode is connected in shunt with a corresponding secondary winding,
   and means to energize said primary winding to supply energy through said secondary windings to said electrodes to heat said electrodes evenly to glowing condition.

4. Electrode purifying apparatus comprising in combination, a transparent, gas filled, evacuable envelope,
   two tungsten electrodes of matched physical configuration mounted in said envelope in spaced relation,
   each said electrode being connected to two terminal structures and each terminal structure including a portion disposed externally of said envelope,
   a flux carrying core member having a primary leg and two parallel secondary legs,
   a primary winding disposed about said primary leg for inducing magnetic flux in said core,
   a secondary winding disposed about each secondary leg,
   each secondary winding having two terminals with one terminal of each secondary winding connected to a common terminal,
   the number of turns of said secondary windings being equal to each other and being substantially less than the number of turns of said primary winding,
   said core having first and second identical flux paths and a third flux path,
   each said identical flux path including said primary leg and one of said secondary legs so that each identical flux path links said primary winding and one of said secondary windings independently of the other secondary winding,
   and said third flux path including said two secondary legs so that said third flux path links said two secondary windings independently of said primary winding,
   means connecting said secondary winding terminals to said electrode terminal portions so that each electrode is conected in shunt with a corresponding secondary winding,
   and means to energize said primary winding to supply energy through said secondary windings to supply equal power to said electrodes to heat said electrodes evenly to glowing condition.

5. Apparatus for heating two electrodes of matched physical configuration to equal glowing condition in an electrode purification operation to provide uniform radiation sensitivity characteristics, said electrodes being mounted in an evacuable envelope in spaced relation and each electrode being connected between two terminals disposed externally of said envelope, comprising a flux carrying core member having a primary leg and two secondary legs, a primary winding disposed about said primary leg for inducing flux in said core, a secondary winding disposed about each secondary leg, each secondary winding having two terminals, the number of turns of said secondary windings being equal to each other and being substantially less than the number of turns of said primary winding, said core having first and second identical flux paths and a third flux path, each said identical flux path including said primary leg and one of said secondary legs so that each identical flux path links said primary winding and one of said secondary windings independently of the other secondary winding, and said third flux path including said two secondary legs so that said third flux path links said two secondary windings independently of said primary winding, means to connect said secondary winding terminals to said electrode terminals so that each electrode is connected in shunt with a corresponding secondary winding, and means to energize said primary winding to supply energy through said secondary windings to said electrodes to heat said electrodes evenly to glowing condition.

6. Apparatus for heating two tungsten electrodes of matched physical configuration to equal glowing condition in an electrode purification operation to provide uniform radiation sensitivity characteristics, said electrodes being mounted in a transparent, gas-filled evacuable envelope in spaced relation and each electrode being connected between two terminals disposed externally of said envelope, comprising a flux carrying core member having a primary leg and two parallel secondary legs, a primary winding disposed about said primary leg for inducing magnetic flux in said core, a secondary winding disposed about each secondary leg, each secondary winding having two terminals with one terminal of each secondary winding connected to a common terminal, the number of turns of said secondary windings being equal to each other and being substantially less than the number of turns of said primary winding, said core having first and second identical flux paths and a third flux path, each said identical flux path including said primary leg and one of said secondary legs so that each identical flux path links said primary winding and one of said secondary windings independently of the other secondary winding, and said third flux path including said two secondary legs so that said third flux path links said two secondary windings independently of said primary winding, means to connect one terminal of each electrode to said common terminal and the other terminal of each electrode to the other terminal of the corresponding secondary winding so that each electrode is connected in shunt with the corresponding secondary winding, and means to energize said primary winding to reduce electrical energy through said secondary windings to cause electric current flow through said electrodes in a resistance heating operation to heat said electrodes evenly to glowing condition.

References Cited by the Examiner

UNITED STATES PATENTS

| | | | |
|---|---|---|---|
| 453,163 | 5/1891 | Ries | 219—50 |
| 1,047,502 | 12/1912 | Coolidge | 219—50 |
| 1,188,148 | 6/1916 | Carney et al. | 219—50 |
| 2,086,120 | 7/1937 | Croden | 336—214 X |

FOREIGN PATENTS

| | | |
|---|---|---|
| 9,435 | 1891 | Great Britain. |

OTHER REFERENCES

Sealey: "Transformers," International Textbook Co., Scranton, Pa. (1948), section 1, pp. 4–7.

RICHARD M. WOOD, *Primary Examiner.*

ANTHONY BARTIS, *Examiner.*